(12) United States Patent
Johnson et al.

(10) Patent No.: US 7,062,389 B2
(45) Date of Patent: Jun. 13, 2006

(54) ENTERPRISE ENERGY MANAGEMENT SYSTEM

(75) Inventors: Daniel T. Johnson, Medina, MN (US); James W. Peterson, Lake Elmo, MN (US); Robert S. McConnell, Woodbury, MN (US)

(73) Assignee: Verisae, Inc., Minneapolis, MN (US)

( * ) Notice: Subject to any disclaimer, the term of this patent is extended or adjusted under 35 U.S.C. 154(b) by 57 days.

(21) Appl. No.: 10/768,957

(22) Filed: Jan. 30, 2004

(65) Prior Publication Data

Related U.S. Application Data

(63) Continuation-in-part of application No. 09/883,779, filed on Jun. 18, 2001.

(60) Provisional application No. 60/444,091, filed on Jan. 31, 2003.

(51) Int. Cl.
*G06F 17/00* (2006.01)

(52) U.S. Cl. .......................................... 702/61; 705/412

(58) Field of Classification Search ................. 702/61, 702/64, 189, 182–185; 700/276, 300; 707/3; 705/63, 412; 361/601, 659
See application file for complete search history.

(56) References Cited

U.S. PATENT DOCUMENTS

| | | |
|---|---|---|
| 4,688,026 A | 8/1987 | Scribner et al. |
| 4,989,141 A | 1/1991 | Lyons et al. |
| 5,537,313 A | 7/1996 | Pirelli ......................... 364/403 |
| 5,748,956 A | 5/1998 | Lafer et al. .................. 395/615 |
| 5,752,244 A | 5/1998 | Rose et al. ...................... 707/5 |
| 5,758,126 A | 5/1998 | Daniels ....................... 395/500 |
| 5,821,937 A | 10/1998 | Tonelli et al. ............... 345/356 |
| 5,831,610 A | 11/1998 | Tonelli et al. ............... 345/335 |
| 5,845,265 A | 12/1998 | Woolston ...................... 705/37 |
| 5,859,778 A | 1/1999 | Kuroda et al. |
| 5,923,850 A | 7/1999 | Barroux .................. 395/200.54 |
| 5,946,662 A | 8/1999 | Ettl et al. ....................... 705/8 |
| 5,980,090 A | 11/1999 | Royal, Jr. .............. 364/479.11 |
| 6,128,602 A | 10/2000 | Northington et al. |
| 6,298,333 B1 | 10/2001 | Manzi et al. |
| 6,385,510 B1 * | 5/2002 | Hoog et al. ................. 700/276 |
| 6,430,542 B1 | 8/2002 | Moran |
| 2001/0047383 A1 | 11/2001 | Dutta |
| 2004/0162642 A1 * | 8/2004 | Gasper et al. .............. 700/286 |

FOREIGN PATENT DOCUMENTS

WO  WO 01/97146 A1  12/2001
WO  WO 02/090914 A1  11/2002

OTHER PUBLICATIONS

Compliance Guidance for Industrial Process Refrigeration Leak Repair Regulations Under Section 608 of the Clean Air Act (Oct. 1995).
Developing an EPA Refrigerant Regulations Compliance Program (Mar. 29, 2002).
Copy of International Search Report dated May 28, 2004.
Copy of International Search Report dated Oct. 15, 2004.

* cited by examiner

*Primary Examiner*—Edward Raymond
(74) *Attorney, Agent, or Firm*—Dorsey & Whitney LLP; Sean D. Solberg

(57) ABSTRACT

A system for managing energy consumption by equipment located at a site. The system includes a database including information relating to pieces of energy consuming equipment located at a site. A server is programmed to calculate an expected energy consumption profile and to notify a user if an actual energy consumption exceeds the expected energy consumption.

5 Claims, 5 Drawing Sheets

ENTERPRISE ENERGY MANAGEMENT SYSTEM

CROSS-REFERENCE TO RELATED APPLICATION

This application claims the benefit of U.S. Provisional Application No. 60/444,091, filed on Jan. 31, 2003, the contents of which is incorporated herein by reference in its entirety, and is also a Continuation-in-Part of U.S. patent application Ser. No. 09/883,779, filed on Jun. 18, 2001, the contents of which is incorporated herein by reference in its entirety.

BACKGROUND OF THE INVENTION

This invention relates generally to a system and method for managing energy consumption by equipment assets located at a site. More specifically, it relates to a system for tracking, evaluating, and responding to equipment energy consumption information at a site or a set of distributed sites.

Energy consumption is typically a significant and ever increasing operating expense faced by large sites or facilities, such as government, commercial retailers, and industrial facilities (collectively "sites"). Currently, facility managers lack a system or tool to track and manage energy consumption by equipment assets located at a site. Management of energy consumption is even more difficult for an enterprise including multiple facilities or sites distributed throughout a large geographic region. For example, a large retail chain having sites distributed at locations throughout the United States may have hundreds of locations each requiring independent monitoring and evaluation. Located within these hundreds of locations may be tens of thousands of pieces of energy consuming equipment, which contribute to the overall energy consumption profile of its site and of the retail chain enterprise. Each year, enterprises lose profits due to their inability to effectively track energy management.

Accordingly, there is a need in the art for a system or method for tracking or monitoring the use of energy consumption by equipment located at one or more sites. There is a further need for a system for evaluating equipment energy consumption and taking action to reduce an overall energy cost.

BRIEF SUMMARY OF THE INVENTION

The present invention, in one embodiment, is a network-based system for managing energy consumption at a site. The system includes a database including a plurality of characteristics relating to an energy consuming equipment located at the site and a database including a plurality of service technicians. A server includes software for determining an expected energy consumption profile, based on the plurality of characteristics relating to the equipment and the site environment. The server generates an alert, if the actual energy consumption exceeds the expected energy consumption.

The present invention, in another embodiment, is a method for managing energy consumption at a site. The method includes collecting a set of information relating to a plurality of pieces of energy consuming equipment located at the site, calculating an expected energy usage profile for the site, based on the information, collecting actual energy consumption data on a periodic basis, comparing the actual energy consumption data to the expected energy usage profile, and triggering an alarm when the actual energy consumption data exceeds the energy usage profile.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
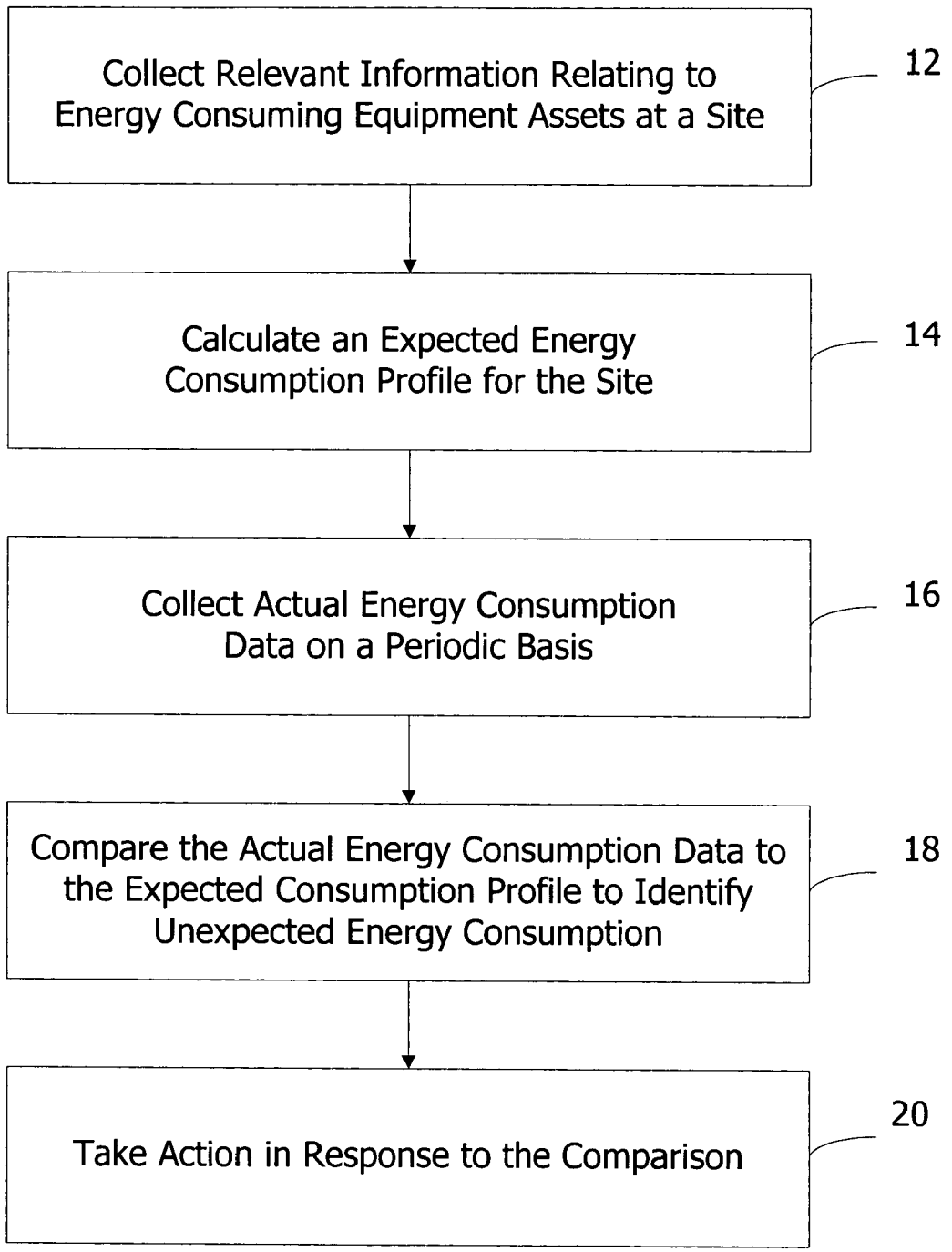
FIG. 1 is a flow chart a method for managing energy consumption at a site, according to one embodiment of the present invention.

FIG. 1 is a flow chart showing an energy management method 10, according to one embodiment of the present invention. As shown in FIG. 1, the energy management method 10 includes collecting relevant information relating to energy consuming equipment assets located at a site (block 12). Based on this information, an expected energy consumption profile is calculated for the site (block 14). Actual energy consumption data is then collected from the site on a periodic basis (block 16). The actual energy consumption data is then compared to the expected consumption profile (block 18). If the actual consumption data exceeds the expected consumption profile, action is taken to address the unexpected energy consumption (block 20). The collection process (block 12) is performed once for each piece of equipment and is distinct from the collection of actual energy consumption (block 16).

Figure 2:
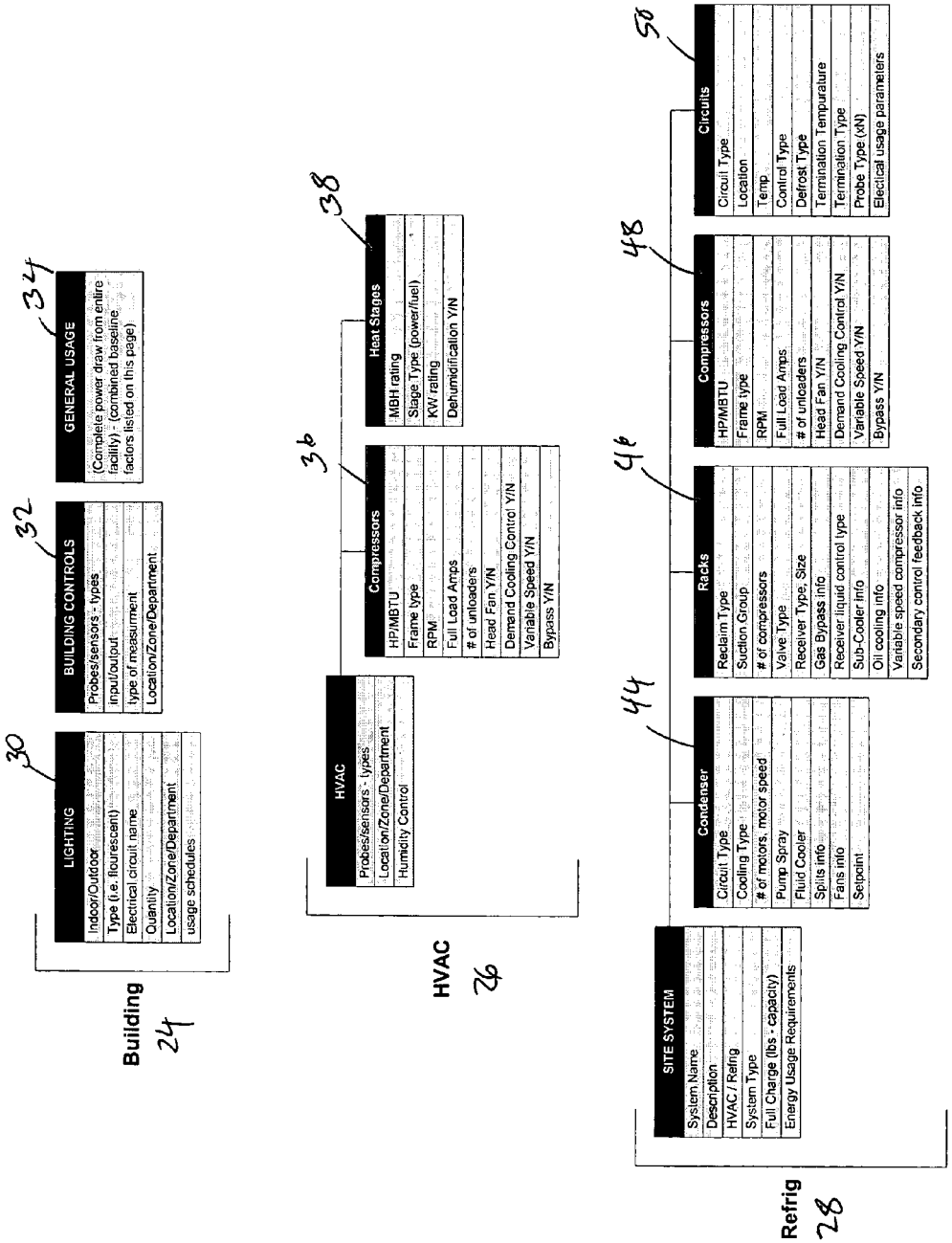
FIG. 2 is a diagram showing the various types of information, relating to energy consuming equipment assets, collected in one embodiment of the present invention.

The equipment for which relevant information is collected (block 12) may include equipment consuming electrical energy, equipment combusting hydrocarbon energy sources (e.g., natural gas or propane) or both. In one embodiment, equipment using water is also included. The information collected for an energy consuming asset varies depending on the type or category of equipment. FIG. 2 is a diagram showing the information collected for various types of equipment, according to one embodiment of the invention. As shown in FIG. 2, equipment may be placed into three categories, namely building 24, HVAC 26, and refrigeration 28. The embodiment of FIG. 2 further categorizes building 24 into lighting 30, building controls 32 and general usage 34. As shown, HVAC 26 is further categorized into compressors 36 and heat stages 38, and refrigeration 28 is further categorized into condensers 44, racks 46, compressors 48, and circuits 50. FIG. 2 further shows several example fields of information that may be collected for each type of equipment.

In one embodiment, the process of collecting information (block 12) is controlled such that each field has a set of acceptable attributes. This approach provides a uniform naming convention, such that the same piece of equipment receives the same name each time it is entered into the system.

Based on the information collected for the equipment located at the site and information known about the site itself, an expected energy consumption profile is calculated. Many techniques and algorithms for calculating expected consumption are known in the art and will function in combination with the present invention. In one embodiment, this expected consumption profile is then adjusted by considering known current operating conditions, weather, environmental conditions, and peak customer traffic. In one embodiment, the expected consumption profile further considers stored historical consumption data for a site, where such data is available.

Actual energy consumption for the site is then collected or monitored during operation. In one embodiment, energy consumption information is manually collected and recorded on a periodic basis. In another embodiment, energy consumption information is collected real-time or near-time using energy sensors or probes. These energy sensors, for example, may be TCP/IP network devices that only need to be connected to the sites communications network. This network could be a wired or wireless network. These network devices then take reading and post real-time energy consumption data to the network for use with the method 10.

The amount of data points collected may also vary significantly. In one embodiment, for example, the actual energy consumption data may include only one electrical meter reading or one gas meter reading (or both) for each broad equipment category. In another embodiment, the actual energy consumption data includes one electrical meter reading or one gas meter reading (or both) for each subcategory of equipment. In yet another embodiment, each piece of energy consuming equipment is monitored individually by a dedicated electric or gas consumption sensor. Any sensor or meter known to those skilled in the art may be used to monitor energy consumption.

Figure 3:
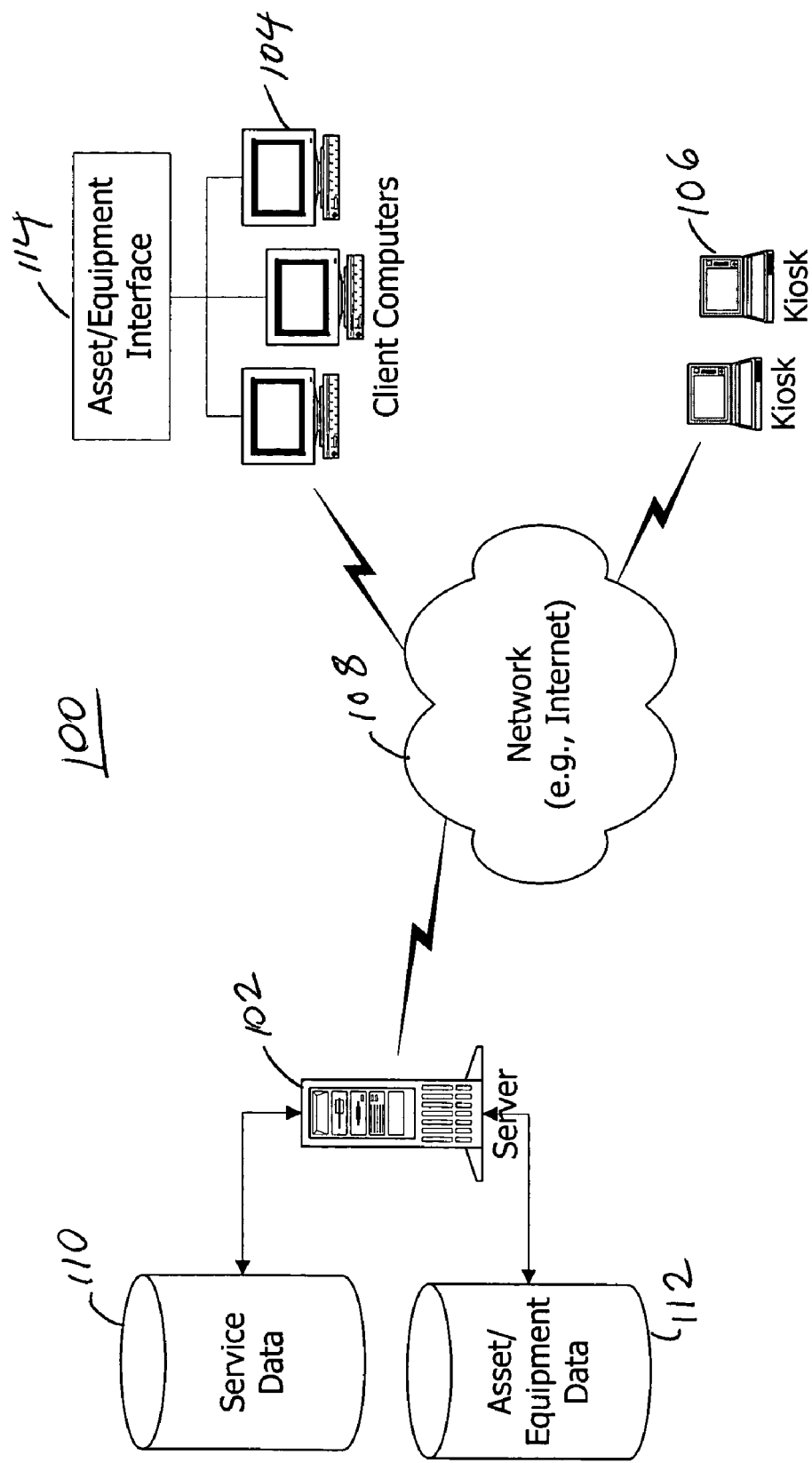
FIG. 3 is a schematic diagram showing an energy management system, according to a second embodiment of the present invention.

In one embodiment, the system of the present invention is implemented in conjunction with an enterprise asset management system for managing the assets of a distributed enterprise. One example of such a system is disclosed in co-pending U.S. patent application Ser. No. 09/883,779, entitled "Method and System for Managing Enterprise Assets," filed on Jun. 18, 2001, which is incorporated herein by reference in its entirety. FIG. 3 is a schematic diagram showing a network-based energy management system 100 according to a second embodiment of the present invention. As shown in FIG. 3 the system 100 includes a server 102 in communication with client computers 104 and kiosks 106 through a network 108. The client computers 104 and kiosks 106 are located at each of the various distributed sites. The system 100 allows a distributed enterprise to monitor and track energy consumption at multiple sites.

As further shown, in one embodiment, the server 102 is in communication with a service database 110 and an asset or equipment database 112. The client computers 104 are in communication with individual pieces of equipment through an asset/equipment interface 114. In one embodiment, this interface 114 is configured to accept input from the energy consumption sensors. In one embodiment, the interface 114 is a local area wired or wireless network. In one embodiment, the interface 114 includes software to translate and normalize signals received from various types of equipment, such as that disclosed in co-pending U.S. patent application Ser. No. 10/734,725, filed on Dec. 12, 2003, which is incorporated herein by reference in its entirety.

Figure 4:
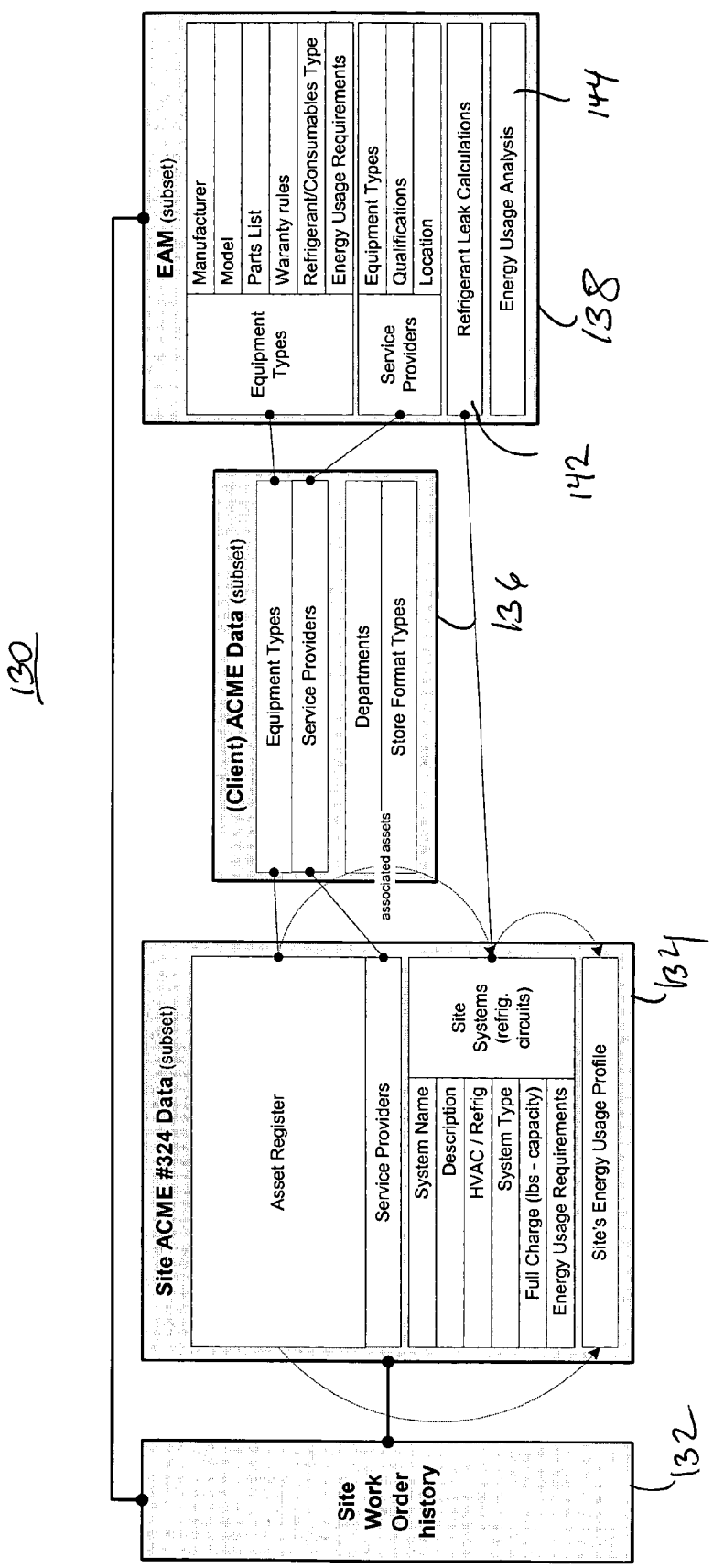
FIG. 4 is a diagram showing a structure for storing energy consumption data, according to one embodiment of the present invention.

In one embodiment of the present invention, the system 100 further tracks and manages refrigerant loss in the enterprises various refrigeration circuits, as disclosed in co-pending U.S. patent application Ser. No. 10/429,619, filed on May 5, 2003, which is incorporated herein by reference in its entirety. FIG. 4 is a diagram showing a database structure 130 for storing information relating to various categories of energy consuming and refrigerant using equipment. The database structure 130 is useful in correlating energy consumption data with refrigerant loss data to explain trends in energy consumption. As shown in FIG. 4, the database structure 130 includes work order data 132, site specific data 134, client or enterprise specific data 136, and general data 138. The structure 130 shown allows various equipment categories and attributes to be configured by the particular enterprise. The work order data 132 includes information relating to repairs of site refrigeration circuits, which are used to calculate refrigeration leaks (block 142).

The structure 130 allows a user to correlate changes in energy consumption (block 144) with refrigeration leaks. This allows a user or the system 100 to explain the reason for unexpected energy consumption or spikes during a particular time period. This could be accomplished, for example, by comparing energy consumption over a specified period of time with refrigerant loss and repair data for the same period of time. If a piece of equipment was operating with a low level of refrigerant, it may explain the spike in energy consumption for that period of time.

Using the information relating to the energy consuming equipment at a site and the actual energy consumption data collected, a user of the method 10 or the system 100 can compare consumption information to utility bills to identify potential billing errors. Likewise, a user can analyze consumption information and identify potential equipment malfunctions in need of repair.

In one embodiment, the database 110 includes information about various service providers, including a list of service providers certified to perform maintenance on equipment. In one embodiment, the database 110 further includes a roster of technicians for each service provider. In one embodiment, a work order is automatically generated and dispatched, by the system 100, requesting repair of the equipment. In this embodiment, a work order is generated in response to detection of unexpected energy consumption. This detection may occur by analyzing historic data for some period of time or by monitoring realtime data obtained from network-ready sensors. Depending upon the level of specificity of the energy consumption monitoring meters and sensors, the system 100 can provide various amounts of specificity on the repair required.

For example, if monitoring is performed on each individual piece of energy consuming equipment, the system 100 can identify the particular piece of equipment that has malfunctioned and can provide that information to the service technician. Furthermore, the system 100 can extract known information relating to the equipment requiring service from the equipment database 112 and provide all relevant information to the service provider. This information allows the service provider to bring all tools and repair parts that may be necessary to complete the repair and further allows the service technician to accomplish the repair more quickly and cost effectively. In one embodiment, the service provider completes the work order using the kiosk 106 located at the site.

Figure 5:
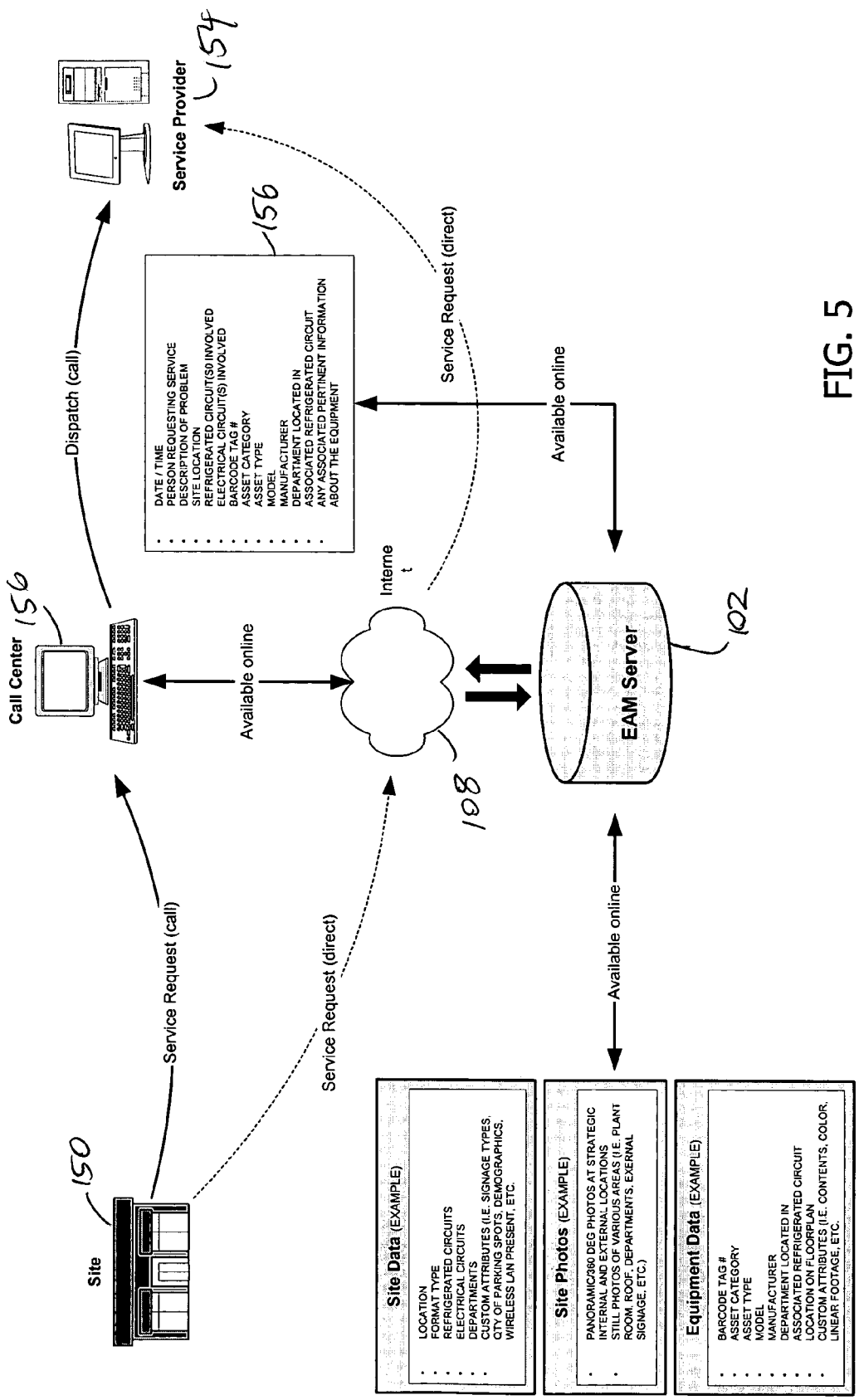
FIG. 5 is a diagram showing a process for using the energy management system to facilitate dispatch of a service provider.

FIG. 5 is a diagram showing the use of the system 100 to facilitate dispatch of a service provider. As shown in FIG. 5, the service request is initiated at a site 150. The service request is communicated to the server 102 through the communication network 108. The server 102 forwards the service request to an appropriate service provider 154. The initial service request may be generated from the site 150 in several different ways. In one embodiment, a person at the site 150 contacts a call center 156, which connects to the server 102 and creates an electronic service request. In another embodiment, an authorized user at the site 150 connects to the server 102 using the communication network 108 and directly places the service request. In another embodiment, the server 102 is receiving signals from various pieces of equipment, as described in further detail above, and based on these signal the server 102 detects a malfunction and automatically generates a service request. The service request may be initiated using the unique code assigned the piece of malfunctioning equipment.

Once a service request is communicated from the site 150 to the server 102, the server 102 compiles a package of useful information known about the equipment for which service is requested, from the system database. For example, in one embodiment, the information displayed in block 156 of FIG. 5 is compiled and communicated to the service provider 154. In other embodiments, more or less information is communicated. As described above, this information may facilitate the service process by providing important information relating to the equipment. In one embodiment, the information further includes a floor plan for the site 150 including a designation of the location of the malfunctioning equipment or a picture of the equipment (or both).

In another embodiment, the method 10 and the system 100 are used to calculate a total cost of ownership of an asset. Currently, retail enterprises generally make equipment purchasing decisions based on the purchase cost of the equipment and a general reliability rating. Retail enterprises lack an effective system for factoring energy consumption in the analysis of a total cost of the equipment. The system 100 tracks and archives energy consumption by energy consuming equipment or groups of equipment in the database 110 or 112. In this embodiment, the server 102 is programmed to calculate a total cost of ownership of a piece of equipment using at least the purchase cost of the equipment, the repair costs associated with the equipment, and the energy consumption cost of the equipment.

Although the present invention has been described with reference to preferred embodiments, persons skilled in the art will recognize that changes may be made in form and detail without departing from the spirit and scope of the invention.

We claim:

1. A system for managing energy consumption by equipment at a site, the system comprising:
   a first database including a plurality of characteristics relating to a piece of energy consuming equipment located at the site;
   a second database including a plurality of service technicians; and
   a server including software for determining an expected energy consumption profile, based on the plurality of characteristics relating to the equipment and the site environment;
   wherein the server generates an alert, if an actual energy consumption exceeds the expected energy consumption, and
   further wherein the server includes total cost software for calculating a total cost of a selected piece of equipment, based on a purchase cost, a repair cost, and an energy consumption cost.

2. The system of claim 1 wherein the server further compares the actual energy consumption to refrigerant loss data.

3. The system of claim 1 wherein the server generates a work order including the plurality of characteristics relating to the piece of energy consuming equipment.

4. A network-based system for managing energy consumption by equipment at a site, the system comprising:
   a first database including a plurality of characteristics relating to a piece of energy consuming equipment located at the site;
   a second database including a plurality of service technicians; and
   a server including software for determining an expected energy consumption profile, based on the plurality of characteristics relating to the equipment and the site environment;
   wherein the server generates a service request, if an actual energy consumption exceeds the expected energy consumption, and
   further wherein the server includes total cost software for calculating a total cost of a selected piece of equipment, based on a purchase cost, a repair cost, and an energy consumption cost.

5. A method of managing energy consumption by equipment located at a site, the method comprising:
   collecting a set of information relating to a plurality of pieces of energy consuming equipment located at the site
   calculating an expected energy usage profile for the site, based on the information;
   collecting actual energy consumption data on a periodic basis;
   comparing the actual energy consumption data to the expected energy usage profile; and
   triggering an alarm when the actual energy consumption data exceeds the energy usage profile; and
   calculating a total cost of a selected piece of equipment, based on a purchase cost, a repair cost, and an energy consumption cost.

* * * * *